(12) United States Patent
Stephan

(10) Patent No.: US 6,220,893 B1
(45) Date of Patent: Apr. 24, 2001

(54) SEVERED WIRE SPLICE

(76) Inventor: Gerard Stephan, 162 Miller Place Rd., Miller Place, NY (US) 11764

(*) Notice: Subject to any disclaimer, the term of this patent is extended or adjusted under 35 U.S.C. 154(b) by 0 days.

(21) Appl. No.: 09/299,226

(22) Filed: Apr. 23, 1999

(51) Int. Cl.[7] .................................................. H01R 13/52
(52) U.S. Cl. ............................................ 439/519; 439/520
(58) Field of Search ..................................... 439/367, 369, 439/370, 519, 520; 174/59

(56) References Cited

U.S. PATENT DOCUMENTS

| 708,692 | * | 9/1902 | Bossert . | |
|---|---|---|---|---|
| 1,174,809 | * | 3/1916 | Bissell . | |
| 2,324,791 | * | 7/1943 | Mcloughlline et al. . | |
| 2,971,180 | * | 2/1961 | Colwell . | |
| 3,033,913 | * | 5/1962 | Dietze . | |
| 3,654,588 | * | 4/1972 | Ruth | 339/89 |
| 4,643,505 | * | 2/1987 | House et al. | 339/75 |
| 4,886,464 | * | 12/1989 | Zetena, Jr. | 439/98 |
| 5,217,387 | * | 6/1993 | Hull et al. | 439/367 |
| 5,584,720 | * | 12/1996 | Elswick | 439/369 |
| 5,772,462 | * | 6/1998 | Osten | 439/367 |
| 5,913,692 | * | 6/1999 | Targett | 439/369 |

* cited by examiner

Primary Examiner—Lincoln Donovan
Assistant Examiner—Thanh-Tam Le
(74) Attorney, Agent, or Firm—Alfred M. Walker

(57) ABSTRACT

A waterproof, sealed splice connector includes a top cover connected to a lower section, providing a hollow interior for insertion of severed portions of an electrical cord therein. The severed portions are clamped within the splice connector and are connected to an electrically conductive connection, such as a terminal block. The splice connector may include sealed entry holes for the severed cord wire sections, to keep the splice connector waterproofed and safe.

10 Claims, 3 Drawing Sheets

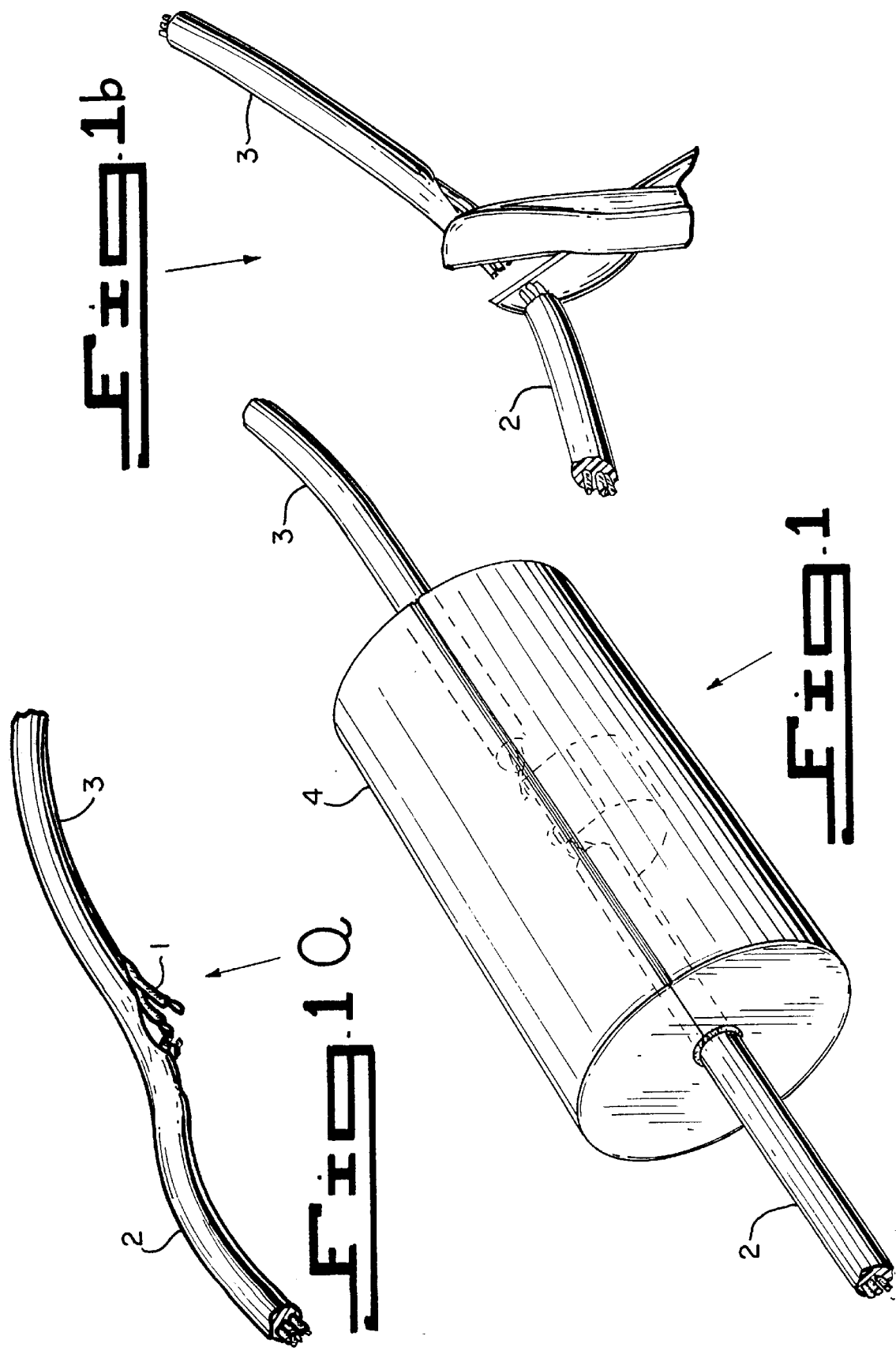

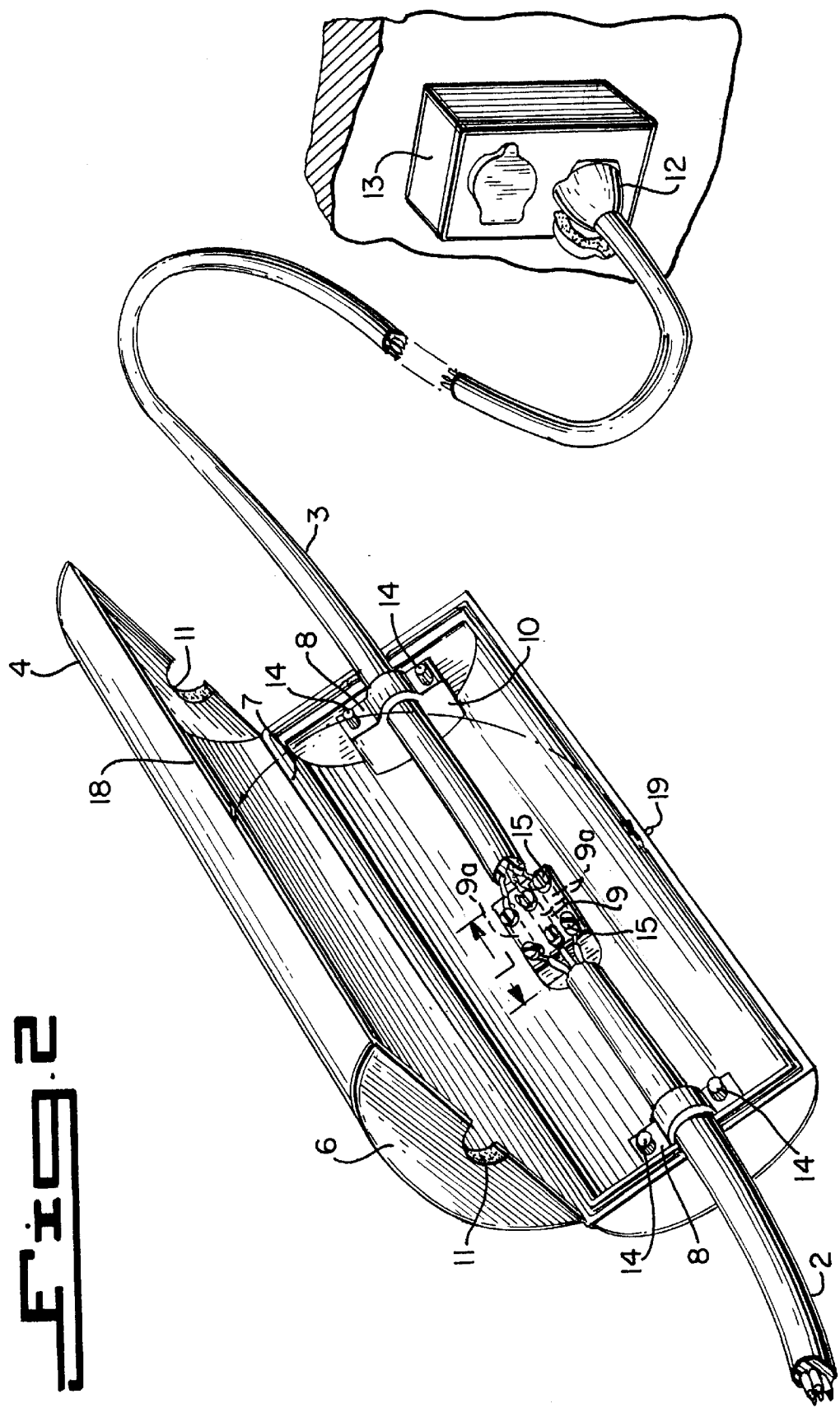

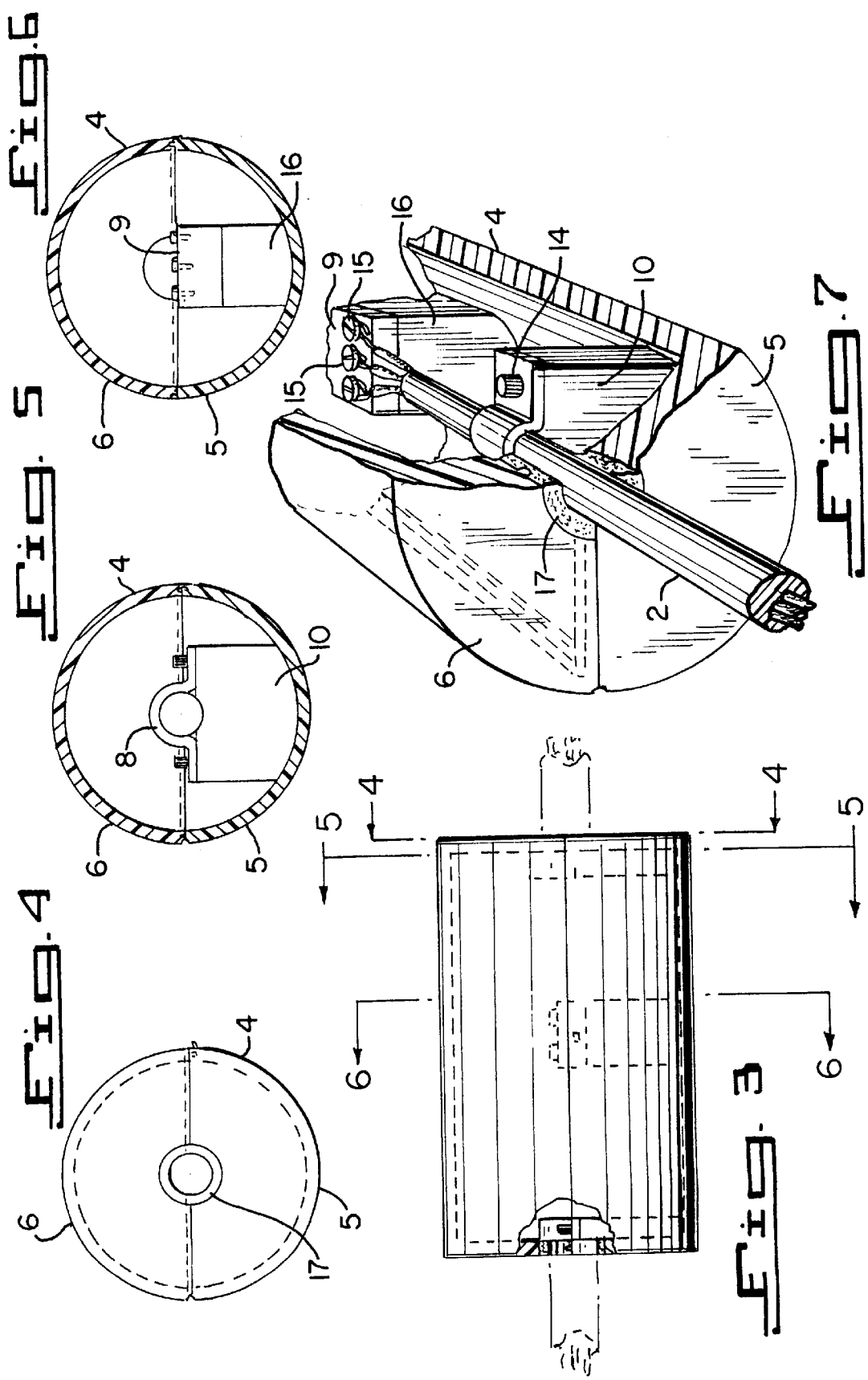

SEVERED WIRE SPLICE

FIELD OF THE INVENTION

The present invention relates to splices for severed electrical wires, especially in hand-held appliance tools, such as drills, sanders, saws, and the like.

BACKGROUND OF THE INVENTION

Especially in an industrial environment and to a lesser extent in commercial and home environments, extension cords or machine tool power cords are severed or damaged. The damage is usually confined to a small area, as would be the case of a sharp object falling on a power cord. A heavy-duty line cord is expensive. Normal wire nut and tape splices are not safe and reliable substitutes for replacement of the entire power cord.

OBJECTS OF THE INVENTION

The object of this invention is to provide a safe, inexpensive and easy to use splice to restore a heavy-duty line or extension cord to normal use. The construction of the splice insures good low electrical resistance connections, high mechanical pull-put resistance, rugged encasement, and the ability to waterproof the splice.

SUMMARY OF THE INVENTION

A splice connector includes a top cover connected to a lower section, by a hinge or by at least one fastener, providing a hollow interior for insertion of severed portions of an electrical cord therein. The severed portions are clamped therein and connected to an electrically conductive connection, such as a terminal block. Preferably the splice connector includes sealed entry holes for the severed cord wire sections, to keep the splice connector waterproofed and safe.

BRIEF DESCRIPTION OF THE DRAWINGS

The present invention can best be understood in conjunction with the accompanying drawings, in which:

FIG. 1a is a perspective view of a severed line cord;

FIG. 1b is a perspective view of a cutting operation before installation of the splice of the present invention;

FIG. 1 is a perspective view of the installed splice of the present invention;

FIG. 2 is a perspective view of the splice with an open housing;

FIG. 3 is a side elevation of the splice;

FIG. 4 is an end view of the splice;

FIG. 5 is a cross-section end view of the splice, taken along line 5—5 of FIG. 3;

FIG. 6 is a cross-section end view of the splice taken along line 6—6 of FIG. 3; and, FIG. 7 is a perspective close-up detail view of the splice, shown in partial cutaway.

DETAILED DESCRIPTION OF INVENTION

FIG. 1a shows a damaged line cord with a proximal section 2, a damaged partly severed region 1 and a distal section 3. The method for repairing the damaged line cord starts with cutting out the damaged section; this is shown in FIG. 1b.

FIG. 1 shows splice housing 4 in place joining proximal section 2 of the damaged line cord with the distal section 3 of the damaged line cord and restoring electrical continuity. Splice housing 4 is preferably cylindrically shaped.

FIG. 2 is a view of splice 4 in an open position. FIG. 2 also shows plug 12 at the distal end of line cord 3 plugged into wall outlet 13. Splice housing 4 includes top semi-cylindrical half cover 6 hinged at hinge 7 to bottom semi-cylindrical housing half section 5. While preferably splice-housing 4 is cylindrical, it may have other geometric shapes.

Furthermore, while FIG. 2 shows top half cover 6 hinged to bottom housing half section 5 by hinge 7, it is anticipated that top half cover 6 and bottom housing half section 5 may be separate pieces joined by one or more fasteners, such as at least one screw (not shown).

In the preferred embodiment the housing is molded in one piece with hinge 7 molded in as a "living hinge". Any of a number on non-conductive resilient high strength resins may be used; these include various grades of glass-filled nylon, ABS, or polyurethane. Semicircular notches 11 in both top half cover 6 and bottom housing half section 5 provide clearance for the line cord sections. A latch is formed from molded nib 19 and notch dimple 18 to snap cover 5 and bottom half section 6 of housing 4 shut.

Clamps 8, which may be made of metal or other non-metallic plastic composition of suitable durability and strength, are held by fasteners 14, such as screws, to molded clamp towers 10 to insure that proximal line end 2 and distal line end 3 of the severed line cord resist mechanical pull-out from splice 4. Preferably molded clamp towers 10 are affixed to an interior wall of bottom half section 5.

While FIG. 2 shows clamp towers 10 and clamps 8 inside of splice housing 4, alternatively clamp towers 10 and clamps 8 can be placed on respective outside ends of splice housing 4 (not shown).

Terminal block 9 with imbedded conductive plates 9a uses screws 15 to restore electrical continuity between proximal end 2 and distal end 3 of the severed line cord. The length "L" of the terminal block can be made somewhat longer than illustrated to compensate for the damaged portion.

The side view of splice housing 4 in FIG. 3 shows the cross section line "5—5" corresponding to FIG. 5 and the cross section line "6—6" corresponding to FIG. 6.

Resilient sleeve 17 is shown in the end view of FIG. 4 within one of the pair of semicircular notches 11 at the end of splice housing 4. A corresponding resilient sleeve is placed at the semicircular notch 11 at the opposite end of splice housing 4. Resilient sleeves 17 are used to seal out moisture and environmental contamination from the interior of splice 4.

FIG. 5 more clearly shows molded clamp towers 10, which support clamps 8 holding proximal and distal ends 2, 3 of the severed wire cord securely in place within splice housing 4. Molded clamp towers 10 are affixed by conventional fastening means, such as by adhesive, or by being molded integrally within bottom half section 5 of splice housing 4.

FIG. 6 shows terminal block tower 16, which is affixed or molded as part of bottom half portion 5 of splice housing 4, preferably at a mid portion thereof.

The detail view of FIG. 7 shows the interior construction of splice housing 4.

While the illustrated construction shows splice housing 4 as a single piece hinged molding, it can also be constructed as two separate half sections that are attached by fasteners, such as screws.

By filling the interior space of splice housing 4 with a plastic seal, such as with room temperature vulcanizing (RTV) silicone, splice housing 4 can be readily waterproofed. In addition, the silicone material provides additional crush resistance to splice housing 4 beyond that which is afforded by the housing material alone.

It is further noted that other modifications may be made to the present invention, without departing from the scope of the invention, as noted in the appended Claims.

I claim:

1. A splice for a severed electrical line cord containing multiple electric conductors severed into two sections with open ends having exposed electric conductors, said splice comprising a hollow housing including a top cover connected to a bottom housing section by a hinge extending along a common edge therebetween, said housing having therein a terminal block with two spaced, parallel rows of screw connectors on a top, flat surface thereof, and said block having imbedded conductive plates connecting corresponding screw connectors in said spaced rows, a pair of clamps spaced from and on opposite sides of said terminal block, each clamp restraining respective sections of said severed electrical line cord from movement within said housing, said sections being aligned with each other and open ends facing each other, said rows of screw connectors being at right angles to the alignment of said sections, said electrical conductors extending from said open ends of said sections and each conductor connected to one of said screw connectors on said terminal block so that corresponding conductors in each electrical wire cord are attached to corresponding screw connectors to provide continuity of said conductors within said electrical line cord through said housing.

2. The splice as in claim 1 wherein said clamps are placed inside of said housing.

3. The splice as in claim 1 wherein said hinge is molded in as a living hinge.

4. The splice as in claim 1 wherein said splice is made of a non-conductive resilient high strength resin.

5. The splice as in claim 1 wherein semicircular notches are provided in both said cover and said bottom housing section, said notches providing clearance for insertion of the severed line cord sections within said splice.

6. The splice as in claim 5 wherein a latch is formed from a nib and a notch dimple, to snap said top cover and said lower housing shut.

7. The splice as in a claim 1 wherein said clamps are attachable to molded clamp towers to insure that a proximal line end of said severed cord and a distal line end of said severed wire cord resist mechanical pullout from said splice.

8. The splice as in claim 5 further comprising a resilient sleeve being provided at each said semi-circular notch to seal out environmental contamination from an interior of said splice.

9. The splice as in claim 1 wherein said top cover is semi-cylindrical and said bottom section is semi-cylindrical, wherein in a closed position of use said splice assumes a shape of a cylindrical shaped body.

10. The method of splicing a damaged electrical line cord containing multiple electric conductors comprising the steps of:

cutting out the damaged portion of said cord to form two end sections with electric conductors extending out from ends of said sections, in a hollow housing having an opened cover, mounting the two end sections at opposite sides of said housing using a pair of clamps with said end sections facing each other and in alignment with each other and said electrical conductors extending into said housing, taking the electrical conductors extending out from said ends of sections and attaching ends of said electrical conductors to respective parallel spaced rows of screw connectors mounted on a top surface of a terminal block, with respective screw connectors in said rows of screw connectors being electrically connected by conductive plates within said terminal block, and closing said cover so that there is uninterrupted electrical conductivity of said electrical conductors from one section of said cord to the other section of said cord.

\* \* \* \* \*